United States Patent [19]

Eichmann et al.

[11] Patent Number: 4,946,028
[45] Date of Patent: Aug. 7, 1990

[54] CONVEYOR BELT TREATMENT

[76] Inventors: Harry A. Eichmann; Gieselle Eichmann, both of S. 8228 Inspiration Dr., Merrimac, Wis. 53561

[21] Appl. No.: 385,066

[22] Filed: Jul. 26, 1989

[51] Int. Cl.5 .............................................. B65G 15/58
[52] U.S. Cl. ............................... 198/688.1; 198/689.1; 198/803.15
[58] Field of Search ....................... 198/803.14, 803.15, 198/688.1, 689.1

[56] References Cited

U.S. PATENT DOCUMENTS

| | | | |
|---|---|---|---|
| 2,698,076 | 12/1954 | Nilsson | 198/803.15 X |
| 3,231,065 | 1/1966 | Kaminski et al. | 198/803.15 |
| 3,812,953 | 5/1974 | Maschke | 198/803.15 |
| 4,671,720 | 6/1987 | Debenham et al. | 198/689.1 X |
| 4,693,370 | 9/1987 | Aceti | 198/803.15 X |
| 4,799,846 | 1/1989 | Wissman et al. | 198/803.15 X |

Primary Examiner—Robert J. Spar
Assistant Examiner—D. Glenn Dayoan
Attorney, Agent, or Firm—Richard C. Litman

[57] ABSTRACT

A system of using a metallic conveyor belt in the manufacture of can lids which prevents can lids from rotating as they are conveyed from one manufacturing station to another. Thus, the lids are not improperly cast and stamped, and as a result, discarded. A frictional augmentation area of specific depth, width, and roughness is formed upon the metallic conveyor belt top surface to prevent the can lid from rotating during manufacture. Thus, the present invention provides a simple and economically benefical improvement to the manufacturing process of can lids.

16 Claims, 2 Drawing Sheets

CONVEYOR BELT TREATMENT

BACKGROUND OF THE INVENTION

1. Field of the Invention

The present invention relates to conveyor belts. More specifically, the present invention relates to an improved metal conveyor belt specifically used the manufacture of lids for can. The present invention provides a means wherein lids disposed on a conveyor belt are more firmly affixed to the belt surface. As a result, the lids are less likely to rotate during the various processes of manufacture.

Can lids are subjected to many stresses as they are conveyed from one manufacturing station to another. As a result, the lids have a tendency to rotate within the holes in the conveyor belt in which they are placed. The rotation of the can lids prevents quality manufacture of the features on the lid. As a result, the lids must be discarded or recycled.

In addition to the difficulties encountred as the can lids are conveyed from one location to another, the can lids are subject to numerous forces during a specific manufacturing process. As a result, it is necessary to fine a means that can hold the can lid in place during the specific manufacturing stage.

Persons have tried to remedy this situation by incorporating rubber conveyor belts into the manufacturing process. However, these rubber belts have a tendency to disintegrate during their lifespan. As a result, the belt leaves small particles of rubber on the can lids. This is an unsanitary condition requiring additional expense to clean the lids before attachment to the cans themselves. Moreover, the rubber belts cost approximately four times that of a metal belt. Thus, the metal belt is preferred from an economic standpoint.

2. Description of the Prior Art

Other inventors have patented conveyor belt systems in this field. U.S. Pat. No. 3,231,065 issued to E. G. Kaminski et. al. on Jan. 25, 1966 discloses an apparatus which is particularly exemplary of the type of conveyor system upon which the present invention improves. Kaminski et. al. teaches that can lids can be stamped if they are conveyed on a conveyor belt that has holes in it to hold the lids in place. However, the problem associated with this particular system is that the can lids rotate in an unacceptable fashion. This creates the need to restamp can lids. As may be obvious, when the percentage of improperly stamped lids becomes large, so too does the cost associated with remanufacture.

The problem of the rotation of can lids on a conveyor belt is a twenty-five year old problem. Many have attempted to correct this difficulty. Primarily, the most common form of correction has revolved around the use of rubber conveyor belts and the like. However, the use of rubber conveyor belts brings to light an additional problem. Foremost of the problem is the unsanitary degradation of these belts during use wherein small particles of rubber become deposited on the can lids.

In reference to the lifespan of rubber belts, it compares well to that of metal belts. In fact, the lifespan of a rubber belt slightly exceeds that of a metal belt. However, as the rubber belt is used, small particles of rubber become dislodged from the surface and contaminate the can lids. This is a wholly unacceptable condition where the can lids must be kept clean to avoid human consumption. Moreover, keeping can lids free of these contaminants require complex and expensive servicing.

Couple this with the fact that rubber conveyor belts cost about four time that of a metal belt, the metal belt becomes a wise economic choice.

The current process utilizes a vacuum device to hold the can lids in place during a specific stage of manufacture. Due to the usual low frictional force between the can lids and the metal surface, the vacuum that heretofore has been applied was relatively high. Moreover, the application of strong suction through a vacuum is very costly. The present invention, because it introduces additional forces between the lid and the conveyor belt, reduces the need for a strong vacuum. Therefore, the overall cost of manufacture is concordantly reduced.

The present invention is a modification of metal conveyor belts which greatly increases the utility of metal conveyor belts in the area of tin can manufacture. Tin can is a generic term for cans which may be constructed of any suitable material such as aluminum. The present invention incorporates a rough groove around the hole in the conveyor belt in which the edge of the can lid sits when placed on the conveyor belt. The rough surface is of a sufficient roughness to prevent the can lid from rotating as it is conveyed from one manufacturing station to another.

The problem of lid rotation has been known since the issuance of the Kaminski patent. However, it has not been until now that a viable solution could be employed to improve the reliability of die casting and stamping. The present invention solves this twenty-five year old problem. It substantially reduces the probability that the can lids may rotate.

SUMMARY OF THE INVENTION

Accordingly, it is an object of the present invention to improve greatly the use of metal conveyor systems in the manufacture of lids for cans.

It is another object of the present invention to provide a method of improving metal conveyor belts such that they can more effectively be used for the manufacture of can lids.

It is an object of the present invention to provide a surface around the hole in which a can lid is placed during the stamping process. The surface around the hole is designed to increase the coefficient of friction between the can lid and the metal conveyor belt.

It is yet another object of the present invention to provide the specific roughness of the area that is most effective in the manufacture of can lids while avoiding the problem of can lid rotation.

It is still another object of the present invention to provide the specific depth of the groove in the conveyor belt that is most applicable to prevent the rotation of can lids during the manufacturing process.

It is another object of the present invention to provide the specific width of the rough groove in the metal conveyor belt surface that is best suited to can lid manufacture.

It is still another object of the present invention to provide a conveyor belt improvement wherein the vacuum that is usually applied to the lid may be reduced by at least a factor of two.

It is another object of the present invention to provide a material which may be applied to the surface of the metel conveyor belt to increase the frictional forces between the can lid and the conveyor belt.

With these and other objects in view which will more readily appear as the nature of the invention is better understood, the invention resides in the novel combination and arrangement of parts hereinafter more fully described and illustrated, with reference being made to the accompanying drawings.

BRIEF DESCRIPTION OF THE DRAWINGS

Similar reference characters designate corresponding parts throughout the various figures of the drawings.

DESCRIPTION OF THE PREFERRED EMBODIMENT

Figure 1:
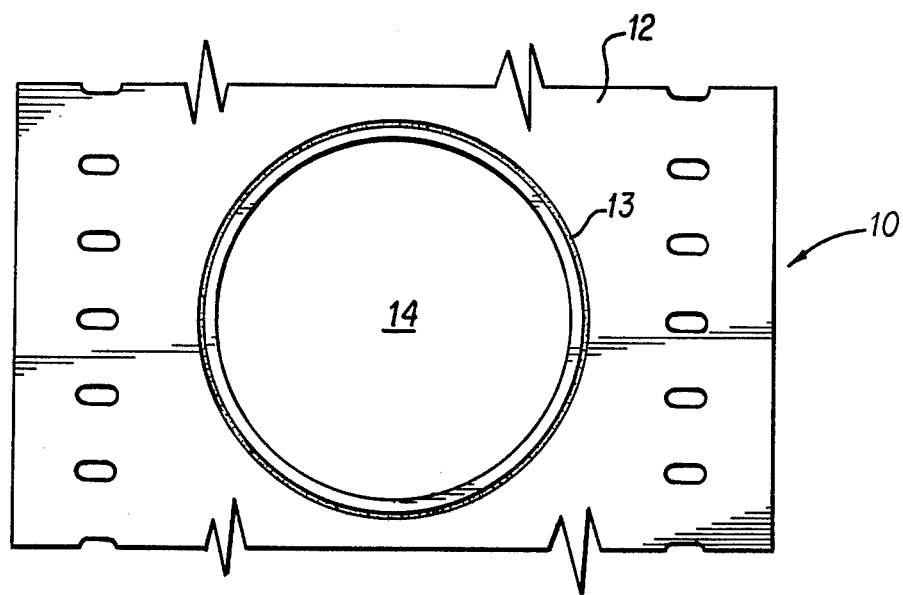
FIG. 1 is a top view of the present invention showing the circular area on a typical metallic conveyor belt.
Figure 2:
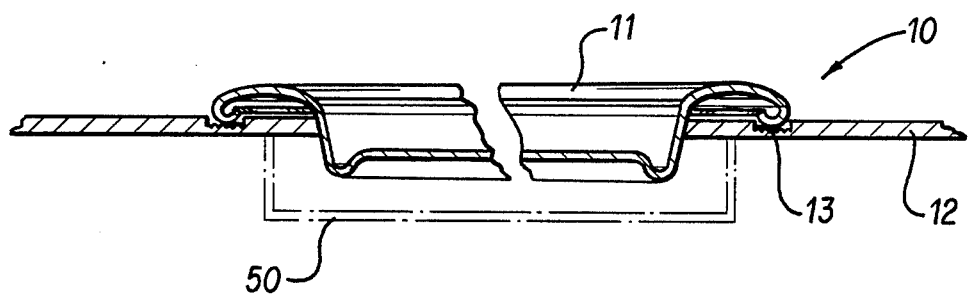
FIG. 2 is a cross-sectional side view illustration of the present invention showing the can lid in place on the metallic sheet.
Figure 3:
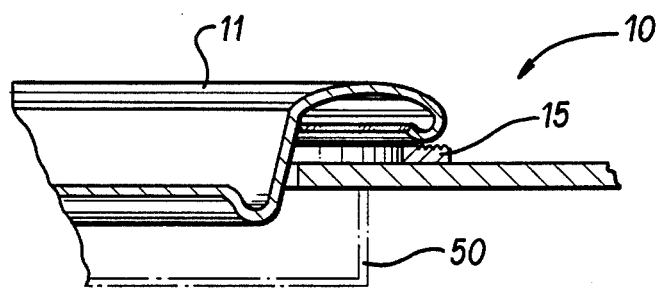
FIG. 3 is a cross-sectional view of an alternate embodiment of the present invention wherein a ridge is added to the surface of the conveyor belt.
Figure 4:
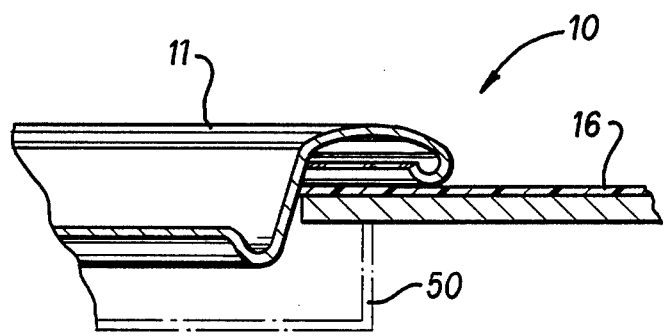
FIG. 4 is a cross-sectional illustration of an alternate embodiment of the present invention wherein the surface of the conveyor belt is coated with a polymeric compound.

Referring now to the drawings, the present invention is generally designated by 10 in FIG. 1. The present invention improves upon the prior art in that it incorporates a new method for affixing can lids 11 to a metallic surface 12. As shown in FIG. 1, a groove 13 is cut into the surface of metal plate 12 having a specific width, depth, and roughness.

In the manufacture of can lids for soft drink cans, beer cans, and the like has been plagued by one particular shortcoming. The can lids 11 have a tendency to rotate on the metallic surface 12 while they are being transported from one station to the next in the manufacturing process. In certain cases, this rotation is not desirable. Take, for example, the manufacture of can lids 11 for soft drinks. First, the lid is printed with the appropriate messages such as "Do not litter", etc. Second, the lid 11 is engraved for the pop top. Third, the pop tab is added.

If the lid rotates during manufacture, the message, pop top, and pop tab can be incorrectly aligned on the lid 11 surface. When the tab, message, and pop top are incorrectly aligned, the lid must be discarded or recycled, because it does not conform to quality control standards. To minimize movement of the lids 11 during manufacture, the present machinery incorporates a vacuum device 50 to hold the lid 11 stationary.

The inclusion of a groove 13 with a rough surface on the metallic plate 12 prevents the lid 11 from rotating while it is being moved from one part of the manufacturing process to another. Moreover, the vacuum that is applied can be reduced considerably, because the frictional froces between the rough surface 13 and the lid 11 increase the static rigidity of the system. In most cases, the vacuum can be decreased by a value of two. In other words, the vacuum that need be aplied with the groove is half the strength of the cacuum that need be applied when the groove is not on the belt surface.

The past twenty five years have seen little improvement to this art. The metal conveyor belt has been abandoned in many instances in favor of a rubber conveyor belt. The rubber conveyor belt is better than the metal in that the rubber surface provides a frictional surface on which the peripheral flange of the can lid 11 may sit. However, the rubber conveyor belts introduce the additional problem of high cost and require servicing that the metal conveyor belt does not.

The metal conveyor belt avoids the particulate contamination problem associated with rubber belts. However, the metal conveyor belt is particularly smooth. It is this feature of the belt that allows the can lid 11 to rotate during manufacture.

It is necessary at this time to describe the manner in which the roughness of a surface is described quantitatively. The present method for measuring roughness is to measure the height and depth of the peaks and valleys on a rough surface. In the older unit system, the average of these values was called the root mean square or RMS. Today, in order not to confuse this unit system with the many other disciplines which use RMS units, the unit of "microfinish" is applied.

In the unit system of microfinish, the larger the numerical value, the rougher is the surface. Thus, a surface which has a roughness of 200 microfinish is more rough than a surface having a roughness of 100 microfinish. Continuing in this fashion, a standard metal conveyor belt has a surface roughness of 32 microfinish. As aforementioned, this is far from rough enough to prevent the can lid 11 from moving within its hole 14 in the metallic surface 12.

However, if one were to provide a groove 13 in the metallic surface 12 that had a roughness of between 32 to 200 microfinish, this is a sufficient roughness to prevent the can lid 11 from turning within its hole 14 in the metallic surface 12. Also, the roughness is of sufficient magnitude to last for the life of the conveyor belt. It is this novelty which is added to the metallic surface 12 that improves on the present system of can lid manufacture considerably.

The groove 13 can be added to the metallic surface 12 in any number of possible fashions as one skilled in the art may be aware. However, in order to simplify the process, the groove 13 of the present invention is added through an electrical process known as electrical discharge machining (EDM). Of course, any suitable means to incorporate a groove 13 in the surface of a metallic surface 12 familiar to those skilled in the art may also suffice.

The present invention incorporates a groove 13 of 150 microfinish. The groove 13 is 1 thousandth of an inch ( 0.001 ) deep. The groove 13 is wide enough to accommodate the flanged perimeter of the lid 11. Any greater width is not necessary as it serves no functional purpose.

Of course, the dimensions provided above may be altered and the same effect achieved. The exact numbers from above describe the most useful dimensions. The roughness can vary between 32 to 200 microfinish and still be useful. However, if the roughness falls below an average of 100 microfinish, the metallic surface 12 becomes too smooth to hold the lid 11 in place. If the surface becomes too rough, the additional roughness serves no additional function. Moreover, the additional roughness becomes costly and requires a still deeper groove. 100 to 200 microfinish is ideal for the present application.

The groove 13 depth also has an ideal operating range. If the groove 13 is from 1 to 3 thousandths of an inch deep, it will function ideally as required. If the groove 13 is less deep than 1 thousandth of an inch, it is not deep enough to provide a surface of the required roughness. If the groove is too deep, then the metallic surface 12 becomes weakened and will not function to specifications. Moreover, if the groove 13 is too deep, then the can lid can not effectively engage the roughened surface.

Thus, the groove 13 of the present invention provides the answer to a twenty-five year old problem. For all of this time, manufacturers have wondered how the metallic conveyor belt could be improved to become a useful tool. The addition of the groove 13 as described provides the needed improvement to the well know system to improve its reliable functioning considerably.

It is possible in an alternate embodiment of the present invention to supply a raised area 15 upon which the can lid 11 would sit. In this embodiment, the raised area 15 is applied to the surface and roughened to the appropriate parameters as described. The raised area may be composed of the same metal as the conveyor belt 12 or it may take any number of forms. Primarily, the raised area could be composed of a polymeric material such as rubber. Thus, the surface would not need to be roughened. The polymeric compound would provide the frictional augmentation sufficient to keep the can lid 11 from rotating during manufacture.

In still another embodiment of the present invention, the roughened surface could be applied to the entire surface of the conveyor belt 12. As a result, there would be no specifically defined area on the surface of the belt 12. The whole belt 12 would be roughened to the appropriate roughness as previously noted. Continuing along the same vein, the entire surface of the belt 12 could be covered with a polymeric compound. As a result, the entire surface would provide the necessary frictional augmentation needed to prevent the inadvertent rotation of the can lids 11 during manufacture. The polymeric compound is designated as 16 throughout the applicable drawings.

It is to be understood that the present invention is not limited to the sole embodiment described above, but encompasses any and all embodiments within the scope of the following claims.

We claim:

1. In an apparatus for the conveyance of can lids during manufacture and stamping, wherein each of said can lids including a central portion radially adjacent, integral with and encircled by a peripheral flange, comprising:
   a metallic sheet having a top surface and a bottom surface,
   said metallic sheet having a plurality of can lid holes therethrough,
   frictional augmentation means on said metallic sheet encircling said can lid holes, said frictional augmentation means comprising a separately defined area adjacent each said can lid hole of said metallic sheet, said frictional augmentation means comprises an area engraved to a specific roughness on said sheet top surface,
   said frictional augmentation means disposed on said top surface of said metallic sheet and positioned relative to said can lid holes to locate said frictional augmentation means beneath said peripheral flange when one of said lids is concentrically disposed atop one of said can lid holes of said metallic sheet,
   whereby said frictional augmentation means provides an increased frictional force between said peripheral flange and said metallic sheet to discourage angular and radial displacement of said can lid relative to said metallic sheet.

2. An apparatus for the conveyance of a can lid during manufacture and stamping according to claim 1, wherein:
   the plane defined by said can lid central portion and the plane defined by said can lid peripheral flange comprise disparate planes.

3. An apparatus for the conveyance of a can lid during manufacture and stamping according to claim 2, wherein:
   said plane defined by said can lid central portion is disposed in a plane other than said plane defined by said can lid periphral flange.

4. An apparatus for the conveyance of a can lid during manufacture and stamping according to claim 1, wherein:
   said frictional augmentation means comprises a concentric ring area, and
   said concentric ring area includes a specific width, a specific depth, and a specific roughness.

5. An apparatus for the conveyance of a can lid during manufacture and stamping according to claim 4, wherein:
   said depth comprising the distance from the surface of said concentric ring area to said sheet top surface.

6. An apparatus for the conveyance of a can lid during manufacture and stamping according to claim 1, wherein:
   said specific roughness is in the range between thirty-two to two hundred microfinish.

7. An apparatus for the conveyance of a can lid during manufacture and stamping accordig to claim 1, wherein:
   said specific roughness is one hundred fifty microfinish.

8. An apparatus for the conveyance of a can lid during manufacture and stamping according to claim 4, wherein:
   said specific width is no greater than the radial extent of said peripheral flange.

9. An apparatus for the conveyance of a can lid during manufacture and stamping according to claim 4, wherein:
   said specific depth is between one to three thousandths of an inch.

10. An apparatus for the conveyance of a can lid during manufacture and stamping according to claim 4, wherein:
    said specific roughness is between thirty-two to two hundred microfininsh.

11. An apparatus for the cnveyance of a can lid during manufacture and stamping according to claim 9, wherein:
    said specific depth comprises one thousandth of an inch.

12. An apparatus for the conveyance of a can lid during manufacture and stamping according to claim 10, wherein:
    said specific roughness comprises one hundred fifty microfinish.

13. An apparatus for the conveyance of a can lid during manufacture and stamping accordgn to claim 4, wherein:
    said ring area comprises a roughened electrical discharged machined area.

14. An apparatus for the conveyacne of a can lid during manufacture and stamping according to claim 1, including:

means operable to apply a downward force to said can lids to increase the coefficient of friction between said can lid peripheral flange and said frictional augmentation means.

15. An apparatus for the conveyance of a can lid during manufacture and stamping according to claim 14, wherein:

said downward force applying means includes a vacuum applied from beneath said sheet bottom surface.

16. In an apparatus for the conveyance of can lids during manufacture and stamping, wherein each of said can lids including a central portion adjacent and encircled by a peripheral flange, comprising:

a metallic sheet having a top surface and a bottom surface, said metallic sheet having a plurality of can lid holes therethrough, frictional augmentation means on said metallic sheet encircling said can lid holes, said frictional augmentation means comprising a separately defined area adjacent each said can lid hole of said metallic sheet, said frictional augmentation comprises a concentric ring area, and said concentric ring area includes a specific width, a specific depth and a specific roughness, said specific depth being between one to three thousandths of an inch, said frictional augmentation means disposed on said top surface of said metallic sheet and positioned relative to said can lid holes to locate said frictional augmentation means beneath said peripheral flange when one of said lids is concentrically disposed atop one of said can lid holes of said metallic sheet, whereby said frictional augmentation means provides an increased frictional force between said peripheral flange and said metallic sheet to discourage angular and radial displacement of said can lid relative to said metallic sheet.

* * * * *